United States Patent [19]

Kleinert

[11] 4,404,650
[45] Sep. 13, 1983

[54] METHOD AND CIRCUIT ARRANGEMENT FOR TRANSMITTING BINARY SIGNALS BETWEEN PERIPHERAL UNITS WHICH ARE CONNECTED TO ONE ANOTHER VIA A CENTRAL BUS LINE SYSTEM

[75] Inventor: Helmuth Kleinert, Munich, Fed. Rep. of Germany

[73] Assignee: Siemens Aktiengesellschaft, Berlin & Munich, Fed. Rep. of Germany

[21] Appl. No.: 228,959

[22] Filed: Jan. 27, 1981

[30] Foreign Application Priority Data

Jan. 30, 1980 [DE] Fed. Rep. of Germany ....... 3003340

[51] Int. Cl.³ ............................................... G06F 9/00
[52] U.S. Cl. .................................................... 364/900
[58] Field of Search ... 364/200 MS File, 900 MS File

[56] References Cited

U.S. PATENT DOCUMENTS

| 3,623,013 | 11/1971 | Perkins et al. | 364/200 |
|---|---|---|---|
| 3,725,871 | 4/1973 | Heuttner et al. | 364/200 |
| 4,086,627 | 4/1978 | Bennett et al. | 364/200 |
| 4,090,238 | 5/1978 | Russo | 364/200 |
| 4,096,572 | 6/1978 | Namimoto | 364/200 |
| 4,106,091 | 8/1978 | Hepworth et al. | 364/200 |
| 4,145,739 | 3/1979 | Dunning et al. | 364/200 |
| 4,225,917 | 9/1980 | Hepworth et al. | 364/200 |
| 4,237,535 | 12/1980 | Wiedenman | 364/200 |
| 4,240,140 | 12/1980 | Stafford et al. | 364/200 |
| 4,304,960 | 12/1981 | Kleinert | 178/3 |

Primary Examiner—Mark E. Nusbaum
Assistant Examiner—Gary V. Harkcom
Attorney, Agent, or Firm—Hill, Van Santen, Steadman & Simpson

[57] ABSTRACT

A method and a circuit arrangement are disclosed for transmitting binary signals between peripheral units which are connected to one another via a central bus line system. The signal transmission is to take place without the necessity of including a central processor, which is likewise connected to the central bus system. For this purpose, it is provided that signal transmission requests from the individual peripheral units are transmitted to a memory access device which is also connected to the central bus line system and which, in response to the receipt of such transmission request, de-activates the central processor in respect of the transmission of signals to the central bus line system. The memory access device supplies the peripheral units which are to participate in a signal transmission operation with control signals which transform the latter from a starting state into a transmitting state or into a receiving state and then, in alternation with control signals which serve for the output and receipt of signal groups. Following the transmission of the last signal of the number of signals reported to the memory access device in respect of a signal transmission operation, the memory access device supplies the peripheral units with a reset signal by which the same are returned from their transmitting and receiving states into their starting states.

7 Claims, 4 Drawing Figures

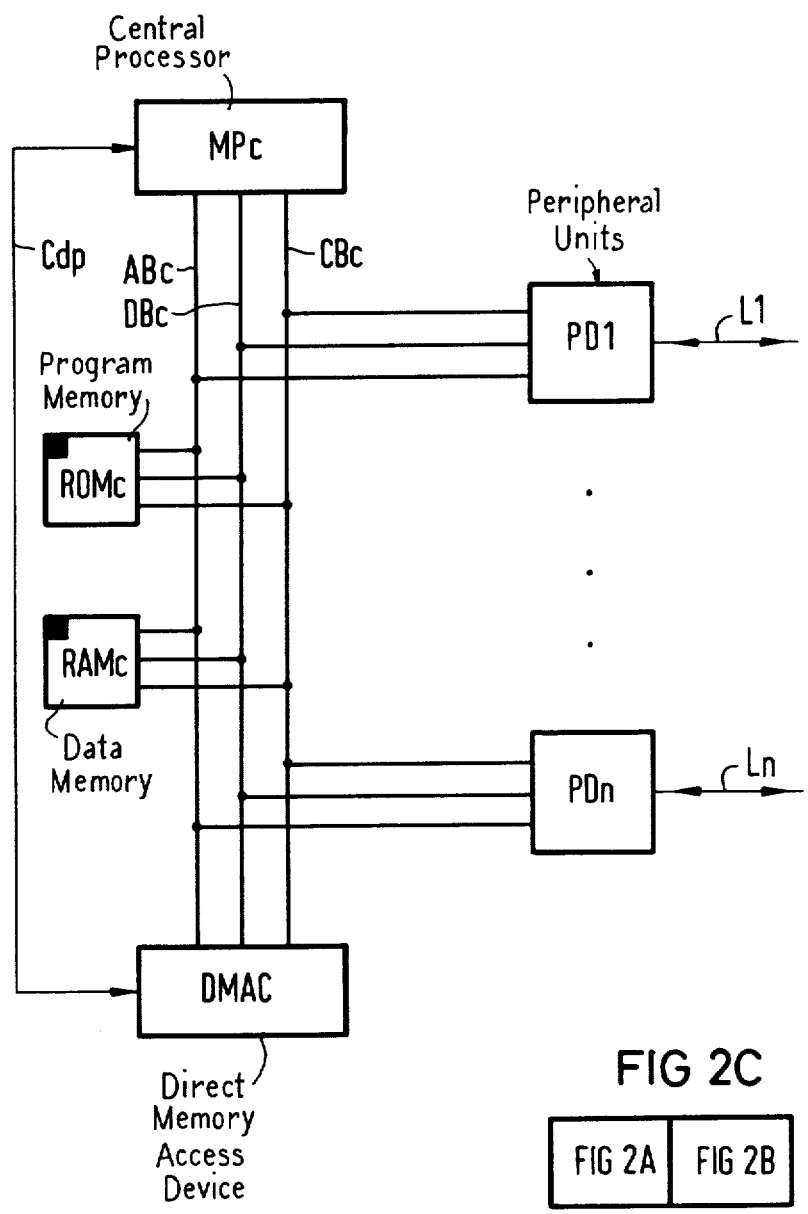
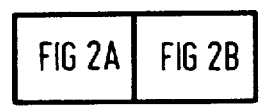

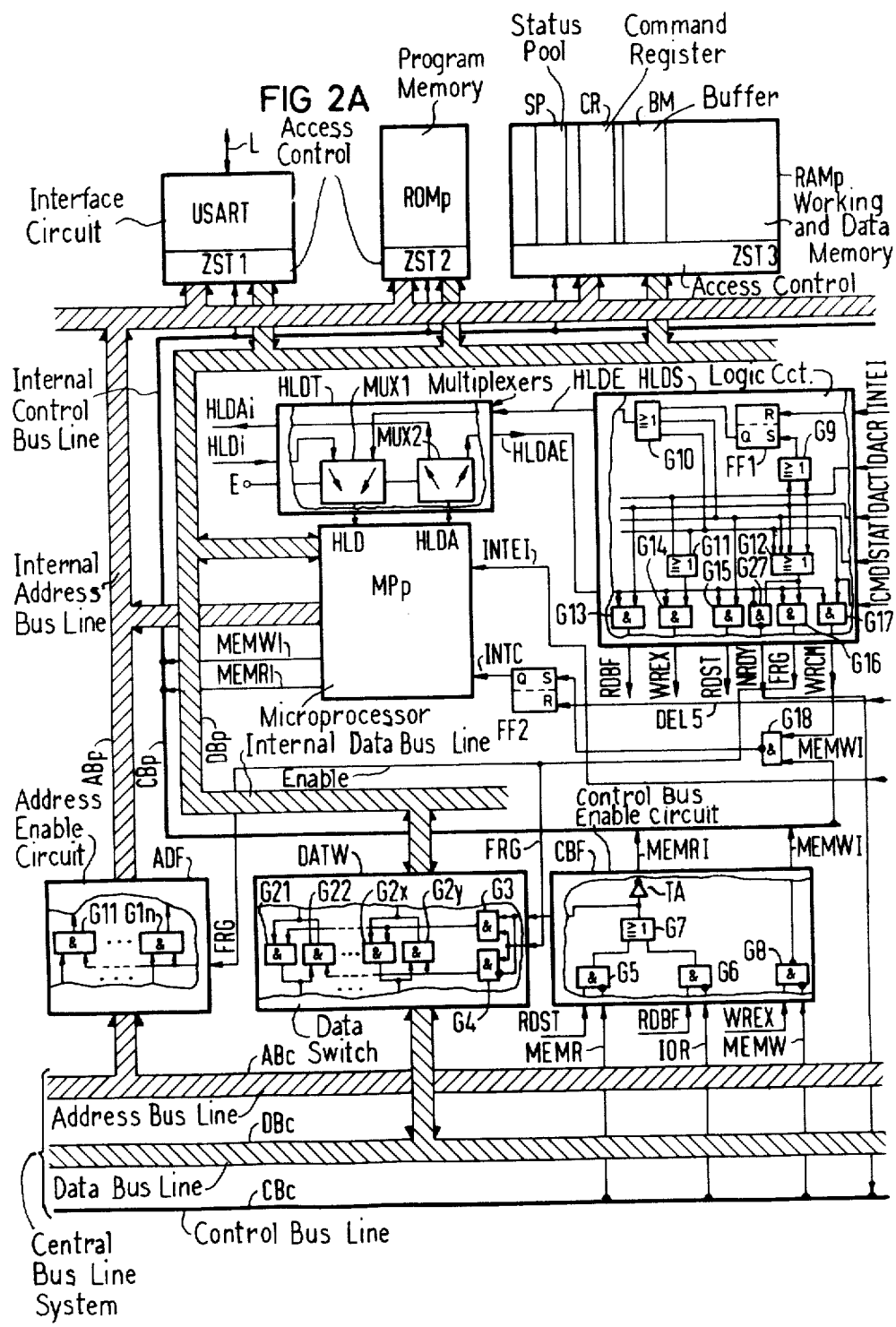

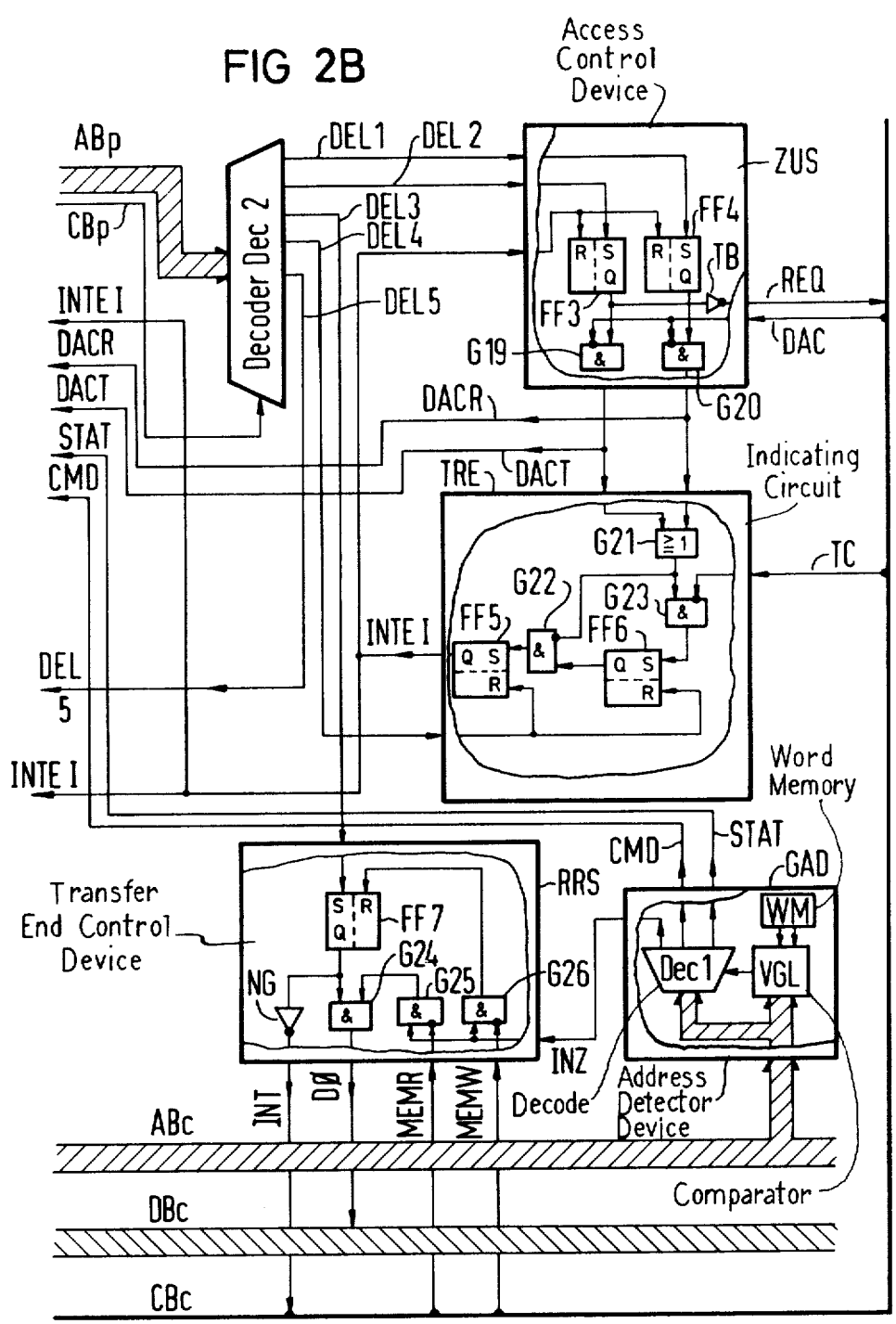

METHOD AND CIRCUIT ARRANGEMENT FOR TRANSMITTING BINARY SIGNALS BETWEEN PERIPHERAL UNITS WHICH ARE CONNECTED TO ONE ANOTHER VIA A CENTRAL BUS LINE SYSTEM

BACKGROUND OF THE INVENTION

1. Field of the Invention

The present invention relates to a method and to a circuit arrangement for transmitting binary signals between peripheral units which are each connected at least to signal transmitters or generators, and peripheral units which are each connected at least to signal receivers, where all the peripheral units are connected to one another via a central bus line system, and are connected to a central control device which controls the signal transmission between the peripheral units and which comprises at least one central processor—in particular a micro-processor—with associated program memories and working memories, and a memory access device which is suitable for direct memory access.

2. Description of the Prior Art

In the context of the transmission of data information in a data transmission system it is already known, for example from U.S. Pat. No. 3,623,013, to control the actual data exchange between a central station, preferably a processor, and at least one of a plurality of data terminals which are connected as subsidiary stations to a common transmission path. In this case, the procedure is such that an address signal transmitted from the central station is compared with the address signals stored in the subsidiary stations. If identity is determined between the address signals which are compared with one another, a control signal which characterizes the availability of the particular subsidiary station is returned to the central station. This means that the data exchange between the individual subsidiary stations and the data terminals is carried out including the central station as a device which first receives and then retransmits the data. This represents a relatively elaborate data exchange procedure.

A teleprinter private branch exchange (PBX) is also known in the art, for example from German Application Ser. No. P 28 46 130.5, in which teleprinter subscriber stations are assigned to a communication unit and wherein, in addition to a central unit, there is also provided a storage unit. Here, the central unit serves to control the connection traffic between individual teleprinter subscriber stations with one another and possibly with one or more teleprinter lines or data lines of a separate teleprinter or data network. The signals which are transmitted from a teleprinter subscriber station or are transmitted thereto can be intermediately stored in the storage unit. In this teleprinter PBX exchange, the communication unit, the central unit and the storage unit are connected to one another via a common bus line system across which the data exchange between the individual units is handled. The handling of the data exchange takes place under the control of the central unit. In response to a pulse signal with which it is supplied by the communication unit, the central unit calls up in the communication unit the procedure which is to be carried out in order to forward the signals in question. This procedure can amount to a transmission of data in the relevant communication unit between the teleprinter stations which are connected to this communication unit.

Although in the case of the above-considered data transmission between teleprinter stations connected to the communication unit, the central unit, in practice, does not participate in the actual data transmission, the call-up of the procedure to be run in the communication unit means that data can only be transmitted in an agreed number between individual teleprinter stations and peripheral nits. Flexibility with regard to the scope of data to be transmitted, which on occasion is desirable, can only be attained by making available an appropriate number of procedures. This, however, entails a corresponding memory expense since the commands which form the individual procedures must be stored separately. Furthermore, such a process involves considerable dynamic loading in the running of the relevant procedures in the central unit.

SUMMARY OF THE INVENTION

The object of the present invention is to provide techniques, including a method and a circuit arrangement, of the type generally referred to above, in which binary signals can be transmitted in a virtually arbitrary number between peripheral units which are connected to one another via a central bus line system, without the need to make available different flow procedures in the form of separate command sequences in accordance with which the relevant signal transmission is effected.

The above object is achieved, according to the present invention, in that prior to the transmission of binary signals to another peripheral unit, each peripheral unit first makes available to the central control device a message signal which designates those peripheral units which are to participate in the particular signal transmission, the central processor is used to repeatedly check on the existence of signals for signal transmission in those peripheral units which have made available message signals, in response to the establishment of the existence of a number of signals requesting signal transmission in a peripheral unit, the peripheral unit in question is supplied with a setting-up signal by which it is changed from a starting state into a transmitting state, whereas those peripheral units which are appointed to receive signals are supplied with a setting-up signal by which they are brought from a starting state into a receiving state, following the above setting-up of the peripheral units which are to be included in a signal transmission procedure, the peripheral unit which has been brought into the transmitting state transmits a signal transmission request signal to the memory access device which subsequently de-actuates the central processor in the central control device in respect of the transmission of signals to the central bus line system and which then emits special control signals in an alternating sequence to the relevant peripheral units together with addresses, which designate access to the relevant binary signals, for the transmission of binary signals from the peripheral unit which has been brought into the transmitting state and for the reception of these binary signals by the peripheral units which have been brought into the receiving state, and following the transmission of the last signal of the number of signals to be taken into account for a signal transmission procedure from the memory access device to the relevant peripheral units, a reset signal is emitted which resets the peripheral units from the transmitting state and receiving state in each case into the starting state.

The invention involves the advantage that it is unnecessary to make available separate flow procedures in order to transmit binary signals in different numbers from one peripheral unit to another peripheral unit and without the need to include a special intermediate storage arrangement in the transmission procedure. Advantageously, the signals in question are transmitted in the form of signal groups or bytes or groups of bytes, where the memory access device is aware of the extent of these signal groups or bytes or groups of bytes through the occurrence of the aforementioned signal transmission request signal. In the memory access device it is then possible, in a relatively easy manner, with the aid of the request signal which indicates the extent of the signal transmission, to determine the number of control signals which must be supplied to the peripheral units participating in the particular transmission procedure for the control of the signal transmission and reception.

Advantageously, at least one of the peripheral units which have been reset into the starting state transmits a control signal which re-actuates the central processor. This involves the advantage that the operation of the central processor in the central control device is automatically resumed when the signal transmission between at least two peripheral units comes to an end. Moreover, the central processor is informed by a second control signal of the termination of the internal processing procedures in the relevant peripheral unit.

For implementing the method of the present invention, it is advantageous to use a circuit arrangement which is characterized in that each peripheral unit comprises a buffer store for the intermediate storage of binary signals which are supplied either from another peripheral unit or from an associated signal transmitter, each peripheral unit comprises an internal control device which, in response to the occurrence of a signal transmission request signal which requests that the peripheral unit in question be included in a signal transmission procedure, initiates the transmission of setting-up signals which enable the particular buffer store for write-in operation or read-out operation, and the buffer store of each peripheral unit is connected by an addressing input both to the control device of its peripheral unit and to an address bus line of the central bus line system.

The above results in the advantage of a relatively low circuit expense in the individual peripheral units and, therefore, in the entire transmission system.

Advantageously, the internal control device which is assigned to the particular peripheral unit contains a micro-processor which is connected via an internal bus line system to an assigned program memory. The buffer store assigned to the relevant peripheral unit is also connected to the particular internal bus line system. The address bus lines and the data bus lines of the internal bus line system and of the central bus line system are connected to one another via enabling circuits. This results in the advantage of a particularly simple and, nevertheless, effective possibility of controlling the buffer store assigned to the particular peripheral unit.

Advantageously, only one address is used for each addressing of the buffer stores of the peripheral units which are to participate in a signal transmission procedure. This results in the advantage of a particularly simple possibility of addressing the peripheral units which are to participate in the relevant signal transmission procedure.

Preferably, the signal transmitters and signal receivers assigned to the relevant peripheral unit are connected via interface circuits to the internal bus line system of the particular peripheral unit. This has the advantage of a simple connection between the peripheral unit in question and its associated peripheral devices. Moreover, this measure advantageously allows the number of peripheral devices which are to be connected to the particular peripheral unit to be extended in a simple fashion. This merely requires that the peripheral devices (signal transmitters, signal receivers) which are to be additionally connected to the peripheral unit in question, should be connected via associated interface circuits to the internal bus line system of the peripheral unit in question.

BRIEF DESCRIPTION OF THE DRAWINGS

Other objects, features and advantages of the invention, its organization, construction and operation will be best understood from the following detailed description, taken in conjunction with the accompanying drawings, on which:

FIG. 1 is a block diagram of a basic construction of a circuit arrangement constructed in accordance with the present invention;

FIGS. 2A and 2B illustrate a possible construction of one of a number of peripheral units provided in the circuit arrangement according to FIG. 1; and FIG. 2C illustrates the interrelationship between the structure of FIG. 2A and the structure of FIG. 2B.

DESCRIPTION OF THE PREFERRED EMBODIMENTS

In the form of a block diagram, FIG. 1 illustrates a circuit arrangement for the transmission of binary signals between peripheral units PD1—PDn. These peripheral units PD1—PDn are connected to one another via a central bus line system. The central bus line system comprises an address bus line ABc, a data bus line DBc, and a control bus line CBc. Each of these three bus lines normally comprises a number of individual lines, for example eight or sixteen lines. The peripheral unit PD1 is also connected to a transmission line L1 which may be connected to at least one signal transmitter and/or at least one signal receiver. The peripheral unit PDn is likewise connected to a transmission line Ln which may also be connected to at least one signal receiver and/or at least one signal transmitter.

The central bus line system is connected to a central control device which controls the signal transmission between the peripheral units PD1—PDn and which comprises at least one central processor MPc and a memory access device DMAC which serves to allow direct memory access. The central processor MPc is formed, in particular, by a micro-processor. The central processor MPc in question is additionally connected via a separate control line Cdp to the memory access device DMAC. Via this control line, the central processor MPc can be de-activated with regard to the transmission of signals to the central bus line system under the control of the memory access device DMAC. This is normally effected in that the relevant terminals of the central processor MPc are brought into a highly ohmic state.

In accordance with FIG. 1, the central control device is also assigned a program memory ROMc and a working memory RAMc. In this example, the program memory ROMc is a read-only memory which can also be programmed under certain conditions, as is well known in the art. On the other hand, the working memory RAMc represents a random access memory. The program memory ROMc and the working memory RAMc are connected by corresponding terminals to the bus lines ABc, DBc, and CBc of the central bus line system.

Before the mode of operation of the arrangement illustrated in FIG. 1 is discussed, attention will first be given to the possible structure, illustrated in FIGS. 2A and 2B, of one of the provided peripheral units PD1—PDn. FIGS. 2A and 2B should be positioned beside one another in the manner illustrated in FIG. 2C.

The peripheral unit illustrated in detail in FIGS. 2A and 2B comprises an internal control device which, in accordance with FIG. 2A, is formed by a micro-processor MPp. The micro-processor MPp is connected by addressing terminals, data terminals, and control terminals to bus lines which are assigned to an internal bus line system. These bus lines include an internal address bus line ABp, an internal data bus line DBp, and an internal control bus line CBp. These bus lines likewise comprise a plurality of lines. The bus lines ABp, DBp and CBp of the internal bus line system are connected via enable circuits, which will be discussed in detail below, to the bus lines ABc, DBc and Cbc of the central bus line system.

The internal address bus line ABp is connected to the central address bus line ABc via an address enable circuit ADF. The address enable circuit ADF can contain a number of AND gates G11-G1n which permit address transmission only from the central address bus line ABc to the internal address bus line Abp. Address transmission in the reverse direction is not possible and, indeed, not intended via the address enable circuit ADF. The enabling of the address transmission in the address enable circuit ADF takes place in that the address enable circuit ADF in question is supplied with a binary signal "1" via an enable line FRG. The enable line FRG in question is connected to the output of a NAND gate G16, as is seen in FIG. 2A.

The internal data bus line DBp is connected to the central data bus line DBc via a data switch DATW which, depending upon its setting, facilitates data transmission either from the central data bus line DBc to the internal data bus line DBp, or from the internal data bus line DBp to the central data bus line DBc. For this purpose, the data switch DATW contains a number of pairs of AND gates G21, G22—G2x, G2y which fulfil switch functions and which are each operated by one of the two AND gates G3, G4. The AND gate G4 receives the signals which are supplied to one of its inputs in inverted form, so that, in fact, it fulfils the function of an inhibiting element. As the two AND gates G3 and G4, which each possess two inputs, are connected in parallel to one another at their inputs, it is insured that when operated, accordingly, only one of these two AND gates emits a binary signal "1" at its output. At one of their inputs, the two AND gates G3, G4 are commonly connected to the output of the aforementioned NAND gate G16. By their other inputs, the two AND gates G3, G4 are connected to the output of a control bus enable circuit CBF. In the same manner as the AND gates G11—G1n, the AND gates G21, G22—G2x, G2y are formed by so-called tristate logic gates which, when not actuated, possess a highly-ohmic output.

The control bus enable circuit CBF connects a few control lines of the central control bus line CBc to a few of the control lines of the internal control bus line CBp. The input lines which are connected to the central control bus line CBc here have been referenced MEMR, IOR and MEMW. The output lines which lead to the internal control bus line CBp have been referenced MEMRI and MEMWI. The control bus enable circuit CBF comprises three AND gates G5, G6 and G8 which are connected by one of their inputs to the lines MEMR, IOR and MEMW, respectively. By their other inputs, the AND gates G5, G6 and G8 are connected to lines RDST, RDBF and WREX, respectively, which lead to a logic circuit arrangement HLDS in the arrangement illustrated in FIG. 2A. The outputs of the two AND gates G5 and G6 are connected to the inputs of an OR gate G7. The output of the OR gate G7 is connected to the aforementioned control line which leads from the control bus enable circuit CBF to the data switch DATW. Moreover, the output of the OR gate G7 is connected via an isolation amplifier TA to the aforementioned output line MEMRI. The other aforementioned output line MEMWI is connected to the output of the AND gate G8. This line leads to an input of the NAND gate G18.

The internal control device of the peripheral unit which has been illustrated by way of an exemplary embodiment in FIGS. 2A and 2B comprises not only the micro-processor MPp illustrated in FIG. 2A, but also a program memory ROMp and a working and data memory RAMp. The two memories ROMp and RAMp are each connected by appropriate terminals via a separate access control circuit ZST2 and ZST3, respectively, to all of the bus lines of the internal bus line system.

In accordance with FIG. 2A, the internal bus line system is additionally connected to an interface circuit USART via an associated access control circuit ZST1. On the other hand, the interface circuit USART is connected to a transmission line L which can, itself, be connected to at least one signal transmitter or signal receiver which serves to transmit or receive binary signals, respectively. The signal transmitter or signal receiver in question will be assumed to consist, in particular, of a teleprinter or a synchronous data terminal. Here, it should be noted that a plurality of signal transmitters and/or signal receivers can be connected to the internal bus line system via an appropriate number of interface circuits.

The micro-processor MPp assigned to the internal control device of the peripheral unit corresponding to FIGS. 2A and 2B is connected by a hold signal input HLD and a hold signal output HLDA to a hold signal transmission circuit HLDA which, in the present example we assume to contain two switching circuits or multiplexer circuits MUX1 and MUX2. The multiplexer circuits MUX1 and MUX2 are controlled by a control signal (binary "0" or binary "1") which can be supplied to a control input E, so that the multiplexer circuits connect the relevant terminals HLD and HLDA of the micro-processor MPp either to the lines HLDE, HLDAE or to the lines HLDI, HLDAI. The last-mentioned lines can be connected, for example, to a memory access device (DMA module). The two lines HLDE and HLDAE connect the hold signal transmission circuit HLDA to the above-mentioned logic circuit arrangement HLDS. Here, the line HLDE is connected to the output of an OR gate G10 which is assigned to the logic circuit arrangement HLDS. The line HLDAE is connected to the one inputs of the AND gates G13, G14, G15, G16, G17 and G27 of the logic circuit arrangement HLDS.

The last-mentioned AND gates G13–G17 of the logic circuit arrangement HLDS are connected at their outputs to the lines RDBF, WREX, RDST, FRG and WRCM illustrated in FIG. 2A. The lines RDBF, WREX and RDST extend to corresponding inputs of the control bus enable circuit CBF. The line FRG, which will be referred to as an enable line, extends to corresponding enable inputs of the address enable circuit ADF and of the data switch DATW. The line WRCM is connected to the second input of the aforementioned NAND, gate G18.

The AND gate G13 of the logic circuit arrangement HLDS is connected at its input, which has not yet been considered, to an input of the relevant circuit HLDS to which leads a line DACT which is connected to an output of the access control device ZUS illustrated in FIG. 2B. Furthermore, two OR gates G9 and G12 are each connected by one input to the above-considered input of the logic circuit arrangement HLDS. The OR gate G9 is connected by a further input, together with an input of an OR gate G11, to an input of the logic circuit arrangement HLDS to which is connected a line DACR which is also connected to a further output of the access control device ZUS.

The aforementioned OR gate G9 is connected by its output to the set input S of a bistable trigger circuit FF1. At its reset input R, the bistable trigger circuit FF1 is connected to an input of the logic circuit arrangement HLDS to which is connected a line INTEI which is, in turn, connected to the output of an indicating circuit TRE which indicates the end of a signal transmission. At its output Q, which in the set state carries a binary signal "1", the bistable trigger circuit FF1 is connected to an input of the OR gate G10. At two further inputs, the OR gate G10 is connected, together with corresponding inputs of the OR gate G12, to inputs of the logic circuit arrangement HLDS to which are connected two lines STAT and CMD which extend from an address detector device GAD indicated in FIG. 2B.

The aforementioned OR gate G11 is connected by its input, not yet considered, to that input of the logic circuit arrangement HLDS which is connected to the line CMD. At its output, the OR gate G11 is connected to a further input of the AND gate G14.

At its second input the AND gate G15 is connected to that input of the logic circuit arrangement HLDS which is connected to the line STAT. The AND gate G16 is connected by its second input to the output of the OR gate G12. The AND gate G17 is connected by its second input directly to that input of the logic circuit arrangement HLDS which is connected to the line CMD.

At one input (which carries out inversion), the AND gate G27 is connected to the line HLDAE, and at a further input it is connected to the output of the OR gate G12. The (inverting) output of the AND gate (tristate logic element) G27 is connected by way of a line NRDY to the control line CBc.

The access control device ZUS illustrated in FIG. 2B comprises a bistable trigger circuit FF3 which is employed as a transmitting trigger stage, and a bistable trigger circuit FF4 which is employed as a receiving trigger stage. The trigger circuit FF3 is connected at its set input S to an output line DEL2 of a decoder Dec2, while the trigger circuit FF4 is connected by its set input S to an output line DEL1 of the decoder Dec2. At its input, the decoder Dec2 is connected to the internal address bus line ABp and also to at least one control line of the internal control bus line CBp.

The decoder Dec2, which is only able to transmit a binary output signal "1" from one of its outputs, is connected by further outputs to the lines DEL3, DEL4 and DEL5. The line DEL3 extends to an input of a transfer end control device RRS illustrated in the lower portion of FIG. 2B. Here, a bistable trigger circuit FF7 is connected at its set input S to the relevant line DEL3. The line DEL4 extends to an input of the aforementioned indicating circuit TRE. This input will be assumed to be connected to the reset inputs R of two bistable trigger circuits FF5 and FF6. The line DEL5 extends to the reset input R of the bistable trigger circuit FF2 illustrated in FIG. 2A. This bistable trigger circuit is connected at its output Q, which in the set state carries a binary signal "1", to an interrupt input INTC of the micro-processor MPp. The line INTEI is connected to a further interrupt line of the micro-processor MPp.

The last-mentioned line INTEI is also connected to an input of the aforementioned access control device ZUS. This input will be assumed to be connected to the reset inputs R of the two bistable trigger circuits FF3 and FF4. The bistable trigger circuit FF3 is connected at its output Q to an input of an AND gate G19. Moreover, the bistable trigger circuit FF3 is connected by its output Q via a request signal line REQ to the central control bus line CBc. By way of an access control line DAC, a further input of the access control device ZUS is connected to a line of the central control bus line CBc. This input of the access control device ZUS is connected to a further input of the AND gate G19 and to an input of an AND gate G20. The AND gate G20 is connected by a further input to the output Q of the bistable trigger circuit FF4.

The outputs of the two AND gates G19 and G20 are connected to the aforementioned lines DACT and DACR, respectively. Furthermore, the relevant outputs of the two AND gates G19 and G20 are connected to the inputs of an OR gate G21 which belongs to the indicating circuit TRE. At its outputs, the OR gate G21 is connected to a (negating) input of an AND gate G22 which fulfils an inhibiting function and to an input of an AND gate G23. The AND gate G23 is connected by a further input to a line TC which is connected to a line of the central control bus line CBc. At its output, the AND gate G23 is connected to the set input S of the bistable trigger circuit FF6. The output Q of the bistable trigger circuit FF6 is connected to the second input of the AND gate G22 which is connected at its output to the set input S of the bistable trigger circuit FF5. The output Q of the bistable trigger circuit FF5 is connected to the aforementioned line INTEI.

The address detector device GAD illustrated in detail in FIG. 2B contains a comparator VGL which is connected at one input to the address bus line ABc of the central bus line system and which is connected at its other input to the output of a word memory WM. The word memory WM contains an address which is specific to the peripheral unit in question and on the occurrence of which on the address bus line ABc the comparator VGL transmits a binary signal "1" to enable a decoder Dec1, whose input is likewise connected to the address bus line Abc of the central bus line system. In the present example, the decoder Dec1 emits a binary signal "1" from one of its three indicated outputs in response to a corresponding decoding of an address with which it is supplied at its input. The outputs in question of the decoder Dec1 are connected to the aforementioned lines STAT and CMD. Moreover, an output of the decoder Dec1 is connected to a line INZ which is connected to the one inputs of two AND gates G25 and G26 of the transfer end control device RRS illustrated in FIG. 2B. At their other inputs, the AND gates G25 and G26 are connected via a line MEMR and via a line MEMW, respectively, to corresponding control lines of the central control bus line Cbc of the central control bus line system.

The bistable trigger circuit FF7 which is assigned to the aforementioned transfer end control device RRS is connected at its reset input R to the output of the AND gate G26. At its output Q, the bistable trigger circuit FF7 is connected to an input of an AND gate G24, which is connected by a further input to the output of the AND gate G25. The output of the AND gate G24, which will likewise be considered to consist of a so-called tristate logic circuit, is connected via a line $D\phi$ to a line of the central data bus line DBc. The aforementioned output Q of the bistable trigger circuit FF7 is also connected via a negator NG and via a line INT to a line of the central control bus line CBc.

The foregoing explanation of the possible circuit structure, illustrated in FIGS. 2A and 2B, of one of the peripheral units provided in the circuit arrangement illustrated in FIG. 1, will now be followed by a general consideration of the mode of operation of the circuit arrangement illustrated in FIG. 1. Then, details of this mode of operation will be discussed making reference to FIGS. 2A and 2B.

In the circuit arrangement illustrated in FIG. 1, the transmission of binary signals, in particular of bit groups or bytes or groups of bytes, between the indicated peripheral units PD1 and PDn takes place in that one peripheral unit, for example the peripheral unit PD1, first transmits a message signal to the central control device from which the message signal is collected. This message signal designates the existence of a signal transfer request from the peripheral unit in question to at least one other peripheral unit, such as the peripheral unit PDn. Such message signals are stored in the data memory RAMc of the central control device. On the basis of such message signals, the central processor MPc of the central control device checks the individual peripheral units which have transmitted these message signals to check whether signals for a signal transmission are already available in these peripheral units. This checking procedure can be a cyclic interrogation procedure through which the abovementioned message signal can also be collected from the central control device.

In response to sensing the existence of a number of signals requesting signal transmission in a peripheral unit, such as the peripheral unit PD1, as a result of a corresponding check this peripheral unit transmitts a signal transmission indication signal to the central control device. The central control device, and, in fact, in particular the central processor MPc of the central control device, supplies the peripheral units appointed to receive the signals, in the present example the peripheral unit PDn, with a setting-up signal which changes the peripheral units or unit out of the starting state into a receiving state. The peripheral unit PD1 is also supplied with a setting-up signal by which it is changed from the starting state into a transmitting state. Following this setting-up of the peripheral units PD1, PDn which are to participate in a signal transmission procedure, for example the peripheral unit PD1 which has been brought into the transmitting state transmits a control signal (via the line REQ) which requests the running of a signal transmission procedure to those peripheral units (PDn) which have been brought into the receiving state. The direct memory access device DMAC has been previously informed by the central processor MPc of the extent of the signal transmission and the address range provided for the signal transmission in the peripheral units. The memory access device DMAC in the central control device also transmits a control signal which de-actuates the central processor MPc in respect of the transmission of signals to the central bus line system. This control signal is transmitted via the control line Cdp. As a result, the memory access device DMAC now undertakes control operations. In the Course of such control operations, the memory access device DMAC then transmits special control signals, together with the requisite addresses, in alternating sequence to the relevant peripheral units PD1, PDn. Here, two different control signals are transmitted; one control signal serves to control the transmission of binary signals from the peripheral unit PD1 which is in the transmitting state, and the other control signal serves to control the reception of these binary signals by the peripheral units which are in the receiving state, thus in the present example the peripheral unit PDn.

Following the transmission of the last signal in the number of signals to be taken into account in a signal transmission procedure, the memory access device DMAC supplies the peripheral units PD1, PDn in question with a reset signal which resets the peripheral units from the transmitting state or receiving state into the starting state. As a result, resetting procedures take place in the relevant peripheral units. Furthermore, as a result of the resetting of the peripheral unit PD1 into the starting state, the central processor MPc will recontinue its previously interrupted operation. The resetting of the peripheral unit PD1 into the starting state also leads to the disappearance of the transmission request from the peripheral unit PD1.

During the signal transmission phase, the central processor MPc is inoperative; at this time the memory access device DMAC undertakes control operations of which the central processor MPc is therefore relieved. As a result, for the period of time during which the central processor MPc is inoperative, the memory access device DMAC can use the supply of addresses of the central processor MPc for the operation of the individual peripheral units, and, in fact, in combination with a special control signal which does not normally occur in association with the relevant addresses from the central processor MPc. As a result, the overall address supply is extended. However, it is also possible to use addresses which are not used by the central processor MPc in the memory access device DMAC to operate the peripheral units, in particular to operate the buffer stores of the peripheral units.

In the manner set forth above, it is now possible not only to transmit binary signals from one peripheral unit to another peripheral unit via the central bus line system, but also to transmit binary signals from one peripheral unit to a plurality of further peripheral units within the scope of a signal distribution procedure via the central bus line system. In this case, the binary signals transmitted from a peripheral unit can either be transmitted simultaneously to all the further peripheral units in question, or the binary signals in question can be supplied consecutively and sequentially to these further peripheral units.

The procedure in one of the peripheral units participating in a signal transmission procedure will be explained in detail in the following, with reference to FIGS. 2A and 2B. In this connection, it will first be assumed that the peripheral unit represented in FIGS. 2A and 2B is in the starting state which consists of a state of readiness to receive binary signals which represent items of data. If, in this state, items of data, for example signalling characters which are to effect an input into the buffer BM of the data memory RAMp, occur on the transmission line L, the following procedures take place.

The binary signals occurring on the transmission line L are first received by the interface circuit USART. The existence of such signals in the interface circuit USART is interrogated, for example, in cyclic repetition, with the aid of the internal microprocessor MPp. If in the course of such an interrogation it is sensed that the interface circuit USART has received binary signals, the micro-processor MPp brings about the restorage or storage of these signals into the buffer BM or into preliminary buffers, connected thereto, in the data memory RAMp. As a result of the subsequent input of such binary signals into the buffer BM (possibly following intermediate storage in a preliminary buffer) information concerning the extent of the binary signals which have been input into the buffer BM are entered into the associated status pool SP of the data memory RAMp. Therefore, this information governs the extent of the requisite signal transmission between the peripheral unit in question and at least one further peripheral unit. As regards the buffer BM it should be additionally noted that its address range can either be predetermined, or can be determined during the establishment of a signal transmission request by a peripheral unit.

Advantageously, however, each buffer will be divided into a plurality of storage zones in order to be able to store a plurality of binary signals. Then, the individual procedure can be such that the control device assigned to the peripheral unit which is in the transmitting state first inputs those binary signals which relate to the transmission to the buffer of at least one peripheral unit which is in the receiving state from the individual preliminary storage zones, in which they are contained, in to the associated buffer, consecutively into a special storage zone, designated by a predetermined address, within the relevant buffer.

As a result of the transmission of the particular predetermined address by the central control device, a read-out command signal and a write-in command signal are supplied to the buffers of those peripheral units which are participating in a signal transmission procedure. On the occurrence of the read-out command signal and the write-in command signal, the binary signals stored in the special storage zone of the buffer of the peripheral unit which is in the transmitting state are read and entered into an appropriately addressed storage zone of the buffer in the particular peripheral unit which is in the receiving state. The binary signals entered in the particular special storage zone of the buffer in the peripheral unit which is in the receiving state are then restored into other storage zones of the buffer in question under the control of the control device (i.e., the micro-processor MPp) assigned to the particular peripheral unit which is in the receiving state, before they are then transmitted from the relevant peripheral unit. Here, the buffer of each peripheral unit is used selectively to transmit or to receive binary signals to or from at least one other corresponding buffer.

Before the procedures connected with the transmission of binary signals via the central bus line system are discussed in detail, a condition which must be fulfilled in the present example will be considered. This condition consists in that the central control device illustrated in FIG. 1 should already be aware of which peripheral units desire to make available binary signals for transmission and to which peripheral units these binary signals are to be transmitted. Such information is advantageously stored in the memory RAMc of the central control device. This information can be transmitted from the peripheral unit in question, such as the peripheral unit illustrated in FIGS. 2A and 2B, via the associated data switch DATW. Here, the information in question can represent the addresses which have been read, for example, from the data memory RAMp under the control of the central micro-processor MPc.

As a result of the occurrence of the addresses of those peripheral units which are to participate in a signal transmission in the central control device—thus these addresses represent message signals—the central processor MPc assigned to the central control device repeatedly interrogates, with regard to the existence of signal transmission requests, those peripheral units which are considered to be peripheral units from which binary signals are to be transmitted to other peripheral units. For this purpose, the central processor MPc transmits the addresses of the relevant peripheral units in a cyclic succession. These addresses occur on the central address bus line ABc. In the case of the peripheral unit illustrated in FIGS. 2A and 2B, such an address is received by the address detector device GAD and is compared with the address which designates the particular peripheral unit and which is contained in the word memory WM. If the comparator VGL determines identity between the two compared addresses, it enables the decoder Dec1 for the decoding of at least a portion of the addresses supplied from the central address bus line ABc. In the example in question, the decoder Dec1 transmits a binary signal "1" from its output via the line STAT. The occurrence of the binary signal "1" causes a halt signal to be emitted via the OR gate G10 and via the line HLDE to the input HLD of the micro-processor MPp which subsequently discontinues the execution of its operations. When the micro-processor MPp comes to a halt, it transmits an acknowledgement signal, indicating this state, from the output HLDA in the form of a binary signal "1". During the transmission of this acknowledgement signal the MPp sets its outputs MEMWi and MEMRi into the state of high impedance. During the time between the occurrence of a binary signal "1" on the line STAT and the occurrence of a binary signal "1" on the line HLDAE, the AND gate G27 emits a "0" signal via the line NRDY to the central control bus line CBc. This signal indicates (to the central control device) that the peripheral unit in question is not yet available to receive signals or control signals. Such readiness does not occur until the binary signal "1" is present on the line HDLAE. This binary signal "1" is also fed to the one inputs of the AND gates G13–G17. Of these AND gates, in the present example the two AND gates G15 and G16 are capable of transmission; they each emit a binary signal "1" from their outputs. The binary signal "1" emitted from the output of the AND gate G15, together with a binary signal "1" emitted simultaneously from the central control device onto the control line MEMR, results in the emission of a corresponding control signal (binary signal "1") via the line MEMRI to the internal control bus line CBp. In addition, a binary signal "1" is supplied to the AND gates G3 and G4 of the data switch DATW both from the output of the control bus enable circuit CBF and via the line FRG. As a result, the AND gates G21–G2x of the data switch DATW are capable of transmission. The binary signal "1" which occurs on the line FRG also causes the AND gates G11–G1n of the address enable circuit ADF to be rendered capable of transmission.

Together with the control signal transmitted via the control line MEMRI, the address occurring on the central address bus line ABc, or at least a portion of such address, causes status information contained in the status pool SP of the data memory RAMp to be called up and transmitted to the central data bus line DBc via the internal data bus line DBp and via the data switch DATW. These call-up procedures can take place over a plurality of cycles. Following the disappearance of the binary signal "1" on the line STAT, the micro-processor MPp in the peripheral unit in question reassumes its normal state in which it handles control operations in accordance with the program contained in its assigned program memory ROMp.

On the basis of the status information, the central processor MPc recognizes the existence of a signal transmission request relating to the actual transmission of binary signals between the aforementioned peripheral units. Subsequently, the central processor MPc emits a command signal, first to the peripheral units provided for the receiving state and then to the peripheral unit provided for the transmitting state. The status information in question indicates the extent of the signal transmission which is to be effected, i.e., how many binary signals or bytes or groups of bytes are to be transmitted.

In the case of the peripheral unit illustrated in FIGS. 2A and 2B, the occurrence of the peripheral unit address, which is transmitted as a consequence of the command signal, leads to the associated address detector device GAD transmitting a binary signal "1" via the command line CMD. The occurrence of this binary signal "1" results in the fact that the associated internal micro-processor MPp reassumes its hold state and that subsequently binary signals "1" occur on the lines WREX, FRG and WRCM. Therefore, in cooperation with the control signal (binary signal "1") which occurs on the control line MEMW, a setting-up signal which occurs at the relevant point in time on the central data bus line DBc is input into the command register CR of the internal data memory RAMp.

The occurrence of the binary signals "1" on the two lines WRCM and MEMWI also leads to the fact that the bistable trigger circuit FF2 is set via the NAND gate G18 with the trailing edge of the binary signal "1" on the line MEMWI. This results in the operation of the interrupt input INTC of the micro-processor MPp which subsequently assumes a state in which a setting-up procedure takes place. In addition, via the internal address bus line ABp, the micro-processor MPp now transmits an address which is decoded by the decoder Dec2 following the transmission of a binary signal "1" via the line DEL1 (in the case of peripheral units provided for the receiving state) and via the line DEL2 (in the case of the peripheral unit provided for the transmitting state). The occurrence of the binary signal "1" leads to the setting of the receiving trigger stage FF4 and of the transmitting trigger stage FF3. The transmitting trigger stage FF3 then transmits a binary signal "1" as a request signal via the line REQ to the central control device illustrated in FIG. 1.

An erasing address which is then emitted from the micro-processor MPp and is received by the decoder Dec2 finally leads to the transmission of a binary signal "1" via the line DEL5 and thus to the resetting of the trigger circuit FF2. At the end of this interrupt operation, the micro-processor MPp resumes the execution of the previously-interrupted program.

Therefore, the peripheral unit switches are to participate in a signal transmission procedure are now in the transmitting state and the receiving state, respectively. The control of the transmission procedures which are now to take place is subject to the influence of the memory access device DMAC illustrated in FIG. 1. As a result of the aforementioned request signals (via the line REQ), the memory access device DMAC first emits, via the control line Cdp, a control signal which de-activates the central processor MPc in the central control device in respect of the transmission of signals to the central bus line system.

When the central processor MPc has been de-activated in respect of the transmission of signals to the central bus line system, the memory access device DMAC in the central control device emits control signals and control pulses consecutively via the line DAC. In the case of the peripheral unit which is in the transmitting state, the occurrence of these signals causes the transmission of binary signals "1" via the line DACT, whose occurrence leads to the setting of the bistable trigger circuit FF1 and, thus, to the stopping of the associated internal micro-processor MPp. Moreover, binary signals "1" are transmitted via the lines RDBF and FRG. The occurrence of a binary signal "0" on the control line IOR from the memory access device DMAC illustrated in FIG. 1, in association with the binary signal "1" on the line FRG, causes the data switch DATW in the relevant peripheral unit to be set in such a manner that data and binary signals can be transmitted via the switch from the internal data bus line DBp to the central data bus line DBc. The binary signals in question are read from the buffer BM in the relevant peripheral unit. For this purpose, the associated data memory RAMp is supplied with an appropriate address via the address enable circuit ADF which has been brought into the transmissive state.

In the case of the particular peripheral unit which is in the receiving state, the occurrence of the control signals or pulses on the line DAC leads to the transmission of a binary signal "1" from the associated line DACR. In the peripheral unit in question, the occurrence of this binary signal "1" results in the following operations. First, the associated bistable trigger circuit FF1 is set, whereby the associated internal micro-processor MPp is likewise brought into the hold state. Consequently, the lines WREX and FRG of the relevant peripheral unit each carry a binary signal "1". The occurrence of these binary signals "1", in turn, results in the fact that in response to the occurrence of a control signal on the control line MEMW from the memory access device DMAC of the central control device, the binary signals which are occurring at this moment on the central data bus line DBc are transmitted via the associated and transmissive data switch DATW to the associated data memory in the peripheral unit in question. In this data memory RAMp, the associated buffer BM is addressed by the address which, at the time in question, is supplied by the central address bus line ABc via the associated address enable circuit ADF which has been brought into the transmissive state. This address is preferably the same address which was used for reading binary signals from the buffer of the peripheral unit which in in the transmitting state. This means that buffer zones, which correspond to one another, within the peripheral units participating in the relevant signal transmission, are addressed.

Following the transmission of the last binary signal from the peripheral unit which is in the transmitting state to the peripheral unit or units which is/are in the receiving state, the memory access device DMAC illustrated in FIG. 1 transmits a special control signal via the line TC. This control signal occurs in the form of a binary signal "0" together with the last binary signal "0" on the associated line DAC. As a result, the bistable trigger circuit FF6 in the associated indicating circuit TRE is set. Loss of a "0" on the line DAC also sets the bistable trigger circuit FF5. As a result, a binary signal "1" is transmitted via the line INTEI of the particular peripheral unit. The occurrence of this binary signal "1" leads to the associated transmitting trigger state and receiving trigger stage (FF3 and FF4) being brought into the reset state and to the bistable trigger circuit FF1 being reset. Moreover, the binary signal "1" in question results in the micro-processor MPp in the peripheral unit being brought out of its hold state which it occupied during the course of the particular signal transmission. The micro-processor MPp can now erase the corresponding setting-up signals which are stored in the command register CR of its associated data memory RAMp. This means that the peripheral unit in question is brought out of its transmitting state into its starting state.

The micro-processor MPp of the peripheral unit in question can also supply the decoder Dec2 with an address which is such that the decoder Dec2 transmits a binary signal "1" via its output line DEL4. As a result, the bistable trigger circuits FF5 and FF6 of the associated indicating device TRE are returned to the reset state.

Procedures corresponding to the above-explained procedures, connected with the occurrence of the control signal on the line TC, also take place in each of the peripheral units which are in the receiving state. In contrast to the conditions explained above, these peripheral units are then, however, each brought from their receiving state into the starting state.

Therefore, on the conclusion of the above-explained operations, the peripheral unit which is in the transmitting state re-occupies its starting state. The peripheral unit or units which was/were in the receiving state supply the central control device with a message signal (via the line INT), for example, when they have processed and forwarded the received binary signals. In the present example, such a message signal is transmitted from the transfer end control device RRS indicated in FIG. 2B, via the line INT. The transmission of a binary signal "0" via the line INT occurs whenever the bistable trigger circuit FF7 in the associated transfer end control advice RRS is set. This bistable trigger circuit FF7 would be set in the course of the above-described transmission conclusion process in those peripheral units which were previously in the receiving state, and, in fact, in that the associated decoder Dec2 emits a binary signal "1" via its output line DEL3. This is the case when the decoder Dec2 is supplied with a corresponding address signal from the associated micro-processor MPp. If several peripheral units are in the receiving state, each of these peripheral units transmitts a binary signal "0" via its line INT. In this case, the central processor MPc determines which peripheral unit has emitted such a signal in that it consecutively addresses the relevant peripheral units (emission of a binary signal "1" via the line INZ) and in each case transmits an interrogation signal via the line MEMR to the AND gate G25 and, therefore, interrogates the state of the trigger circuit FF7 via the AND gate G24. If the associated bistable trigger circuit FF7 is set, via the output line D$\phi$ the AND gate G24 transmits a binary signal "1" when, when received by the central processor MPc, causes the central processor MPc to transmit a signal via the line MEMW, together with the same address as in the case of the interrogation of this state, for resetting the trigger circuit FF7 via the AND gate G26.

As a result of the reception of the binary signals "1" transmitted via the lines INT, the central processor MPc is informed of the termination of the signal transmission; it can subsequently erase those states which related to the signal transmission in the central control zone. Furthermore, it can continue with procedures relating to other signal transmission operations. However, it is first necessary to conclude the described resetting operations which relate to the resetting of the relevant trigger circuit FF7.

Finally, it should be noted that commercially available modules can be employed to construct the circuit arrangements illustrated on the drawings. Therefore, the central processor MPc and the micro-processor Mpp can be formed by micro-processors of the type 8085 as produced by Intel Company. The memory access device DMAC can be formed by a module of the type 8257 produced by the Intel Company. The program memories ROMc, ROMp can be formed by modules of the type 8708 manufactured by the Intel Company. The working memory RAMc and the data memory RAMp can be formed by one or more modules of the type 2119 manufactured by the Intel Company. The interface circuit USART can be formed by a module of the type 8251A produced by the Intel Company. The switch circuits MUX1, MUX2 can be formed by modules of the type SN74151, while conventional integrated circuits can be employed for the other circuit elements illustrated in FIGS. 2A and 2B.

Although I have described my invention by reference to a particular illustrated embodiment, many changes and modifications of the invention may become apparent to those skilled in the art without departing from the spirit and scope of the invention. I therefore intend to include within the patent warranted hereon all such changes and modifications as may reasonably and properly be included within the scope of my contribution to the art.

I claim:

1. A circuit arrangement for transmitting binary signals comprising:
- a plurality of peripheral units which are connected to signal generators and signal receivers and which may be conditioned to a transmitting state, a receiving state or a starting state;
- a central bus line system interconnecting said peripheral units for carrying control, data and address signals on respective control, data and address bus lines;
- a central control device connected to said bus line system and including a central microprocessor, a data memory, a program memory and a direct memory access device each connected to said bus line system;
- request signal means in each of said peripheral units operable to transmit a request message to said central control device including a transmission request signal and addresses of other peripheral units which are to receive binary signals, said central microprocessor operable to poll said peripheral units for said request messages and transmit a respective setting-up signal to said other peripheral units;
- each of said peripheral units comprising means responsive to the respective setting-up signal to transfer the respective peripheral unit from the starting state to the respective transmitting or receiving state;
- each of said peripheral units including means operable in the transmitting state to transmit a signal transmission request signal to said direct memory access device, said transmission request signal indicating the number of binary signals to be transmitted, and said direct memory access device responsive to said transmission request signal to transmit a deactivation signal to said central microprocessor to prevent the transmission of signals therefrom to said bus line system;
- each of said peripheral units comprising a buffer for intermediate storage of signals supplied thereto by other peripheral units and by the respective signal generator and an internal control device which is responsive to said request message to apply control signals to said buffer enabling the same for a respective read or write operation, said buffer including an address input connected to said internal control device and to an address bus line of said central bus line system;
- said direct memory access device including means operable to transmit special control signals in an alternating sequence to the peripheral units together with the addresses which designate access to said buffer of a peripheral unit in the transmitting state for the transmission of binary signals to said buffers of those peripheral units in the receiving state; and
- means in said direct memory access device for monitoring the number of binary signals transmitted and operable in response to the transmission of the number of binary signals indicated by said signal transmission request signal to transmit a reset signal to reset said peripheral units into their starting states.

2. The circuit arrangement of claim 1, wherein:
said internal control device of each of said peripheral units comprises an internal bus line system, a program memory, and a microprocessor connected to said program memory by way of said internal bus line system;
said buffer is connected to said internal bus line system; and
said internal bus line system comprising an address bus line; and
said internal control device further comprising an address enable circuit interconnecting said internal address bus line and said address bus line of said central bus line system.

3. The circuit arrangement of claim 1, wherein:
each of said peripheral units comprises means operable in response to a reset signal to transmit an activation signal to reactivate said central microprocessor.

4. The circuit arrangement of claim 1, and further comprising:
a plurality of interface circuits assigned to respective ones of said peripheral units and connecting said signal generators and signal receivers to said central bus line system.

5. In a method for transmitting binary signals between peripheral units, which are each connected at least to signal generators, and peripheral units which are connected at least to signal receivers, in which all of the peripheral units are interconnected via a central bus line system and a central control device which is connected to the central bus line system and operable to control signal transmission and which successively generates addresses identifying individual ones of the peripheral units, and which comprises a micro-processor, associated program and working memories and a direct memory access device which is operable to provide direct memory access, the improvement therein comprising the steps of:
- prior to the transmission of binary signals from one peripheral unit to another, transmitting from a peripheral unit to the central control device a message signal which requests transmission and designates those other peripheral units which are to participate in a signal transmission operation;
- repetitively checking at the central control device micro-processor for the presence of signal on the bus line system for signals in the peripheral units which have transmitted request message signals;
- transmitting from the central control device setting-up signals to transfer a requesting peripheral unit from a starting state into a transmitting state and all designated peripheral units from a starting state into a receiving state;
- transmitting from a requesting peripheral unit a signal transmission request signal to the direct memory access device causing the same to deactivate the central control device microprocessor to prevent the transmission of signals therefrom to the bus line system and identify the number of signals to be transmitted;
- transmitting from the direct memory access device a predetermined number of special control signals in an alternating sequence to the peripheral units together with addresses which designate access to the binary signals for transmission of the binary signals from the peripheral units which are in the transmitting state and for reception of the binary signals by the peripheral units which are in the receiving state;

monitoring the number of binary signals transmitted with respect to the number of signals designated by the transmission request signal; and following the transmission of the last signal of the stated number of signals, transmitting from the direct memory access device to the peripheral units a reset signal to reset the peripheral units into the starting state.

6. The improved method of claim 5, and further comprising the step of:

transmitting a control signal from at least one of the peripheral units which have been reset into the starting state to the central microprocessor to reactivate the same.

7. The improved method of claim 5, wherein each of the peripheral units comprises a control device and a buffer having a plurality of regions, and further comprising the steps of:

for a peripheral unit in the transmit state, storing signals to be transmitted into a second buffer region from a first buffer region;

upon emission of an address by the central control device, transmitting a read command signal and a write command signal to the respective peripheral units;

upon transmission of the read command signal and the write command signal, reading the stored signals from the second buffer region of the transmitting peripheral unit and writing the same into a correspondingly addressed memory region of the buffer of the peripheral units which are in the receive state; and transferring the signals written into the buffer of a receiving peripheral unit into a respective other memory region before transmission thereof to the respective signal receiver.

* * * * *